(12) United States Patent
Kajuluri et al.

(10) Patent No.: US 12,418,795 B2
(45) Date of Patent: *Sep. 16, 2025

(54) TRANSMISSION OF AUTHENTICATION KEYS

(71) Applicant: Ford Global Technologies, LLC, Dearborn, MI (US)

(72) Inventors: Venkata Kishore Kajuluri, Farmington Hills, MI (US); Jacob David Nelson, Westland, MI (US); Cameron Smyth, Wyandotte, MI (US)

(73) Assignee: Ford Global Technologies, LLC, Detroit, MI (US)

( * ) Notice: Subject to any disclaimer, the term of this patent is extended or adjusted under 35 U.S.C. 154(b) by 438 days.

This patent is subject to a terminal disclaimer.

(21) Appl. No.: 18/051,529

(22) Filed: Nov. 1, 2022

(65) Prior Publication Data

US 2024/0147237 A1 May 2, 2024

(51) Int. Cl.
*H04W 12/069* (2021.01)
*G06F 8/65* (2018.01)
*H04W 12/0471* (2021.01)

(52) U.S. Cl.
CPC ............ *H04W 12/069* (2021.01); *G06F 8/65* (2013.01); *H04W 12/0471* (2021.01)

(58) Field of Classification Search
CPC . H04W 12/069; H04W 12/0471; H04W 4/44; G06F 8/65; H04L 9/0819; H04L 9/0891; H04L 9/40; H04L 63/0435; H04L 2209/84

See application file for complete search history.

(56) References Cited

U.S. PATENT DOCUMENTS

| 6,711,264 | B1 | 3/2004 | Matsumoto et al. |
| 8,295,492 | B2 | 10/2012 | Suarez et al. |
| 10,474,446 | B2 | 11/2019 | Sharma et al. |
| 10,812,261 | B2 | 10/2020 | Usui et al. |

(Continued)

FOREIGN PATENT DOCUMENTS

CN 114365450 A 4/2022

OTHER PUBLICATIONS

Shashank Dhaneshwar , "Insights into FOTA for automotive" (Year: 2017).*

(Continued)

*Primary Examiner* — Dhaval V Patel
(74) *Attorney, Agent, or Firm* — Christopher Storms; Brooks Kushman P.C.

(57) ABSTRACT

A vehicle system includes a first control module, a plurality of second control modules, and a vehicle network. The vehicle network communicatively couples the first control module and the second control modules. The first control module is programmed to generate an update command including a plurality of authentication keys and transmit the update command over the vehicle network. The update command is functionally addressed to be receivable by the second control modules. Each second control module is programmed to receive a configuration file; in response to receiving the update command, identify the authentication keys in the update command that are associated with that second control module based on the configuration file; and update with the identified authentication keys.

20 Claims, 5 Drawing Sheets

(56) References Cited

U.S. PATENT DOCUMENTS

| | | |
|---|---|---|
| 11,178,133 B2 | 11/2021 | Troia |
| 2009/0323969 A1* | 12/2009 | Nishi .................. H04J 13/00 |
| | | 380/281 |
| 2010/0223463 A1 | 9/2010 | Sakaguchi et al. |
| 2010/0290627 A1 | 11/2010 | Tsuji et al. |
| 2011/0225653 A1* | 9/2011 | Maeda ................. G06F 21/57 |
| | | 709/224 |
| 2012/0243683 A1 | 9/2012 | Oba et al. |
| 2017/0288976 A1 | 10/2017 | Wang et al. |
| 2018/0048473 A1 | 2/2018 | Miller et al. |
| 2018/0076959 A1 | 3/2018 | Komano et al. |
| 2018/0145991 A1* | 5/2018 | McCauley ............ H04L 9/0891 |
| 2018/0152341 A1* | 5/2018 | Maeda .................. H04L 41/082 |
| 2018/0218158 A1* | 8/2018 | Amano ............. H04L 12/40006 |
| 2019/0173862 A1* | 6/2019 | Kim ........................ H04L 9/083 |
| 2019/0187971 A1 | 6/2019 | Wang et al. |
| 2020/0177561 A1 | 6/2020 | Kruger |
| 2021/0155202 A1 | 5/2021 | Smyth et al. |
| 2021/0174607 A1 | 6/2021 | Ju et al. |
| 2021/0373875 A1 | 12/2021 | Solomon et al. |
| 2024/0118880 A1 | 4/2024 | Kajuluri et al. |

OTHER PUBLICATIONS

Final Office Action dated Dec. 27, 2024 re U.S. Appl. No. 18/045,571, filed Oct. 11, 2022.

Non-Final Office Action for U.S. Appl. No. 18/045,571, filed Oct. 11, 2022, as issued by the USPTO Jul. 1, 2024.

\* cited by examiner

TRANSMISSION OF AUTHENTICATION KEYS

BACKGROUND

Symmetric-key algorithms are cryptographic algorithms using the same cryptographic keys for encrypting unencrypted data and for decrypting encrypted data. Symmetric-key algorithms can use stream ciphers or block ciphers. Stream ciphers encrypt characters of a message one by one. Block ciphers encrypt a block of bits while padding the plaintext. An example of block ciphering is the Advanced Encryption Standard algorithm promulgated by the National Institute of Standards and Technology.

DETAILED DESCRIPTION

Figure 1:
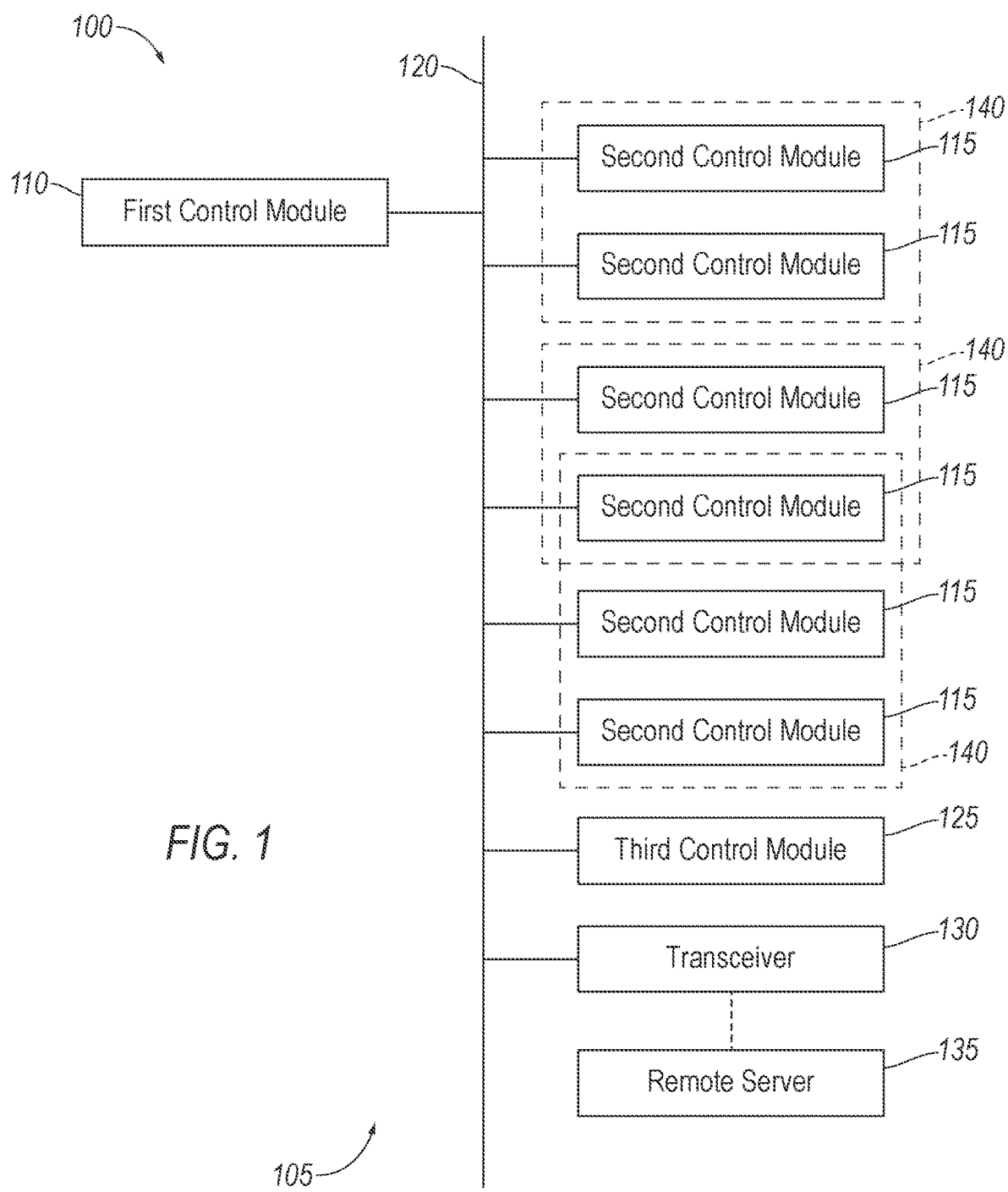
FIG. 1 is a block diagram of an example vehicle.

Modern vehicles typically include several control modules that control various functions of the vehicle. The control modules can communicate with each other by sending messages through a vehicle network such as a Controller Area Network (CAN) bus. Communications between the control modules may be encrypted, e.g., using a symmetric-key algorithm. In a communication in which one of the control modules is a sender and one of the control modules is a receiver, the sender and the receiver may both have the same authentication key stored, which the sender uses to encrypt the communication and the receiver uses to decrypt the communication. The encryption can prevent the contents of the communication being known if the communication is intercepted. The control modules on board a vehicle may use several authentication keys, e.g., for respective functions or features of the vehicle. An authentication key for a particular function may be distributed to the control modules responsible for that function and not to other control modules. Each control module may have zero, one, or a few authentication keys depending on the functions for which that control module is responsible.

However, if a third party discovers one of the authentication keys, then the third party may be able to understand the contents of an intercepted communication. Thus, distributing the authentication keys must be done in a secure manner. An initial distribution of authentication keys can be performed at the time that the vehicle is manufactured. A subsequent distribution of authentication keys may occur, e.g., if control modules are repaired or replaced.

Described herein are techniques for distributing the authentication keys to the control modules in a manner that is both secure and quick. One of the control modules, referred to herein as the first control module, may be responsible for distributing the authentication keys to other control modules, referred to herein as the second control modules. The first control module is programmed to generate an update command including the authentication keys and transmit the update command over a vehicle network, e.g., the CAN bus. The update command is functionally addressed to be receivable by the second control modules. Functional addressing permits the update command to be sent to all the second control modules at once, rather than piecemeal with physically addressed commands sent individually to the second control modules. Each second control module is programmed to receive a configuration file; in response to receiving the update command, identify the authentication keys in the update command that are associated with that second control module based on the configuration file; and update with the identified authentication keys. The authentication keys are thereby transmitted more quickly, preventing a possible delay during the manufacturing process. The configuration files inform the second control modules which authentication keys the second control modules should use to update.

A vehicle system includes a first control module, a plurality of second control modules, and a vehicle network. The vehicle network communicatively couples the first control module and the second control modules. The first control module is programmed to generate an update command including a plurality of authentication keys and transmit the update command over the vehicle network, and the update command is functionally addressed to be receivable by the second control modules. Each second control module is programmed to receive a respective configuration file; in response to receiving the update command, identify the authentication keys in the update command that are associated with that second control module based on the respective configuration file; and update with the identified authentication keys.

In an example, the configuration files may indicate the authentication keys that are associated with the respective second control modules. In a further example, each configuration file may indicate the authentication keys that are associated with the respective second control module and may not indicate the authentication keys that are associated with others of the second control modules.

In another further example, the configuration files may list key identifiers for the authentication keys that are associated with the respective second control modules.

In an example, the update command may lack an association between the authentication keys and the second control modules.

In an example, more than one of the second control modules may be associated with one of the authentication keys.

In an example, the first control module may be further programmed to receive a transmission command, and transmit the update command in response to receiving the transmission command. In a further example, the first control module may be further programmed to validate the transmission command, and refrain from transmitting the update command until the transmission command is validated.

In another further example, the configuration files may be second configuration files, the first control module may be further programmed to receive a first configuration file, and after receiving the first configuration file, receive the transmission command.

In an example, the authentication keys in the update command may be encrypted. In a further example, the authentication keys in the update command may be differently encrypted from each other.

In an example, the update command may be receivable by a third control module that is not associated with any of the authentication keys in the update command.

In an example, the first control module may be further programmed to receive a plurality of verifications indicating that the second control modules received the update command. In a further example, the first control module may be further programmed to, upon failing to receive at least one of the verifications from at least one of the second control modules, retransmit the update command over the vehicle network.

In an example, the authentication keys may be symmetric encryption keys.

In an example, each second control module may be programmed to, in response to receiving the update command, transmit a verification to the first control module.

In an example, the second control modules may be programmed to encrypt messages with the authentication keys. In a further example, a first key of the authentication keys may be associated with a group of the second control modules, and each second control module in the group may be programmed to encrypt messages to others of the second control modules in the group with the first key.

In an example, each configuration file may indicate at least one group of the second control modules to which the respective second control module belongs, and the second control modules in each group may be associated with one of the authentication keys.

A method includes receiving a configuration file by a second control module; generating an update command including a plurality of authentication keys by a first control module; transmitting the update command over a vehicle network by the first control module; in response to receiving the update command, identifying the authentication keys in the update command that are associated with that second control module based on the configuration file by the second control module; and updating with the identified authentication keys by the second control module. The update command is functionally addressed to be receivable by a plurality of control modules including the second control module.

With reference to the Figures, wherein like numerals indicate like parts throughout the several views, a vehicle system 105 of a vehicle 100 includes a first control module 110, a plurality of second control modules 115, and a vehicle network 120. The vehicle network 120 communicatively couples the first control module 110 and the second control modules 115. The first control module 110 is programmed to generate an update command 200 including a plurality of authentication keys 210 and transmit the update command 200 over the vehicle network 120. The update command 200 is functionally addressed to be receivable by the second control modules 115. Each second control module 115 is programmed to receive a second configuration file; in response to receiving the update command 200, identify the authentication keys 210 in the update command 200 that are associated with that second control module 115 based on the second configuration file; and update with the identified authentication keys 210.

With reference to FIG. 1, the vehicle 100 may be any passenger or commercial automobile such as a car, a truck, a sport utility vehicle, a crossover, a van, a minivan, a taxi, a bus, etc.

The vehicle system 105 includes the first control module 110. The first control module 110 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The first control module 110 can thus include a processor, a memory, etc. The memory of the first control module 110 can include media for storing instructions executable by the processor as well as for electronically storing data and/or databases, and/or the first control module 110 can include structures such as the foregoing by which programming is provided.

The vehicle system 105 includes the vehicle network 120. The first control module 110 may transmit and receive data through the vehicle network 120. The vehicle network 120 may be or include a controller area network (CAN) bus, Ethernet, WiFi, Local Interconnect Network (LIN), onboard diagnostics connector (OBD-II), and/or by any other wired or wireless communications network. The vehicle network 120 may communicatively couple the first control module 110, the second control modules 115, third control modules 125, a transceiver 130, and other components of the vehicle 100.

The vehicle system 105 includes the second control modules 115. The second control modules 115 are microprocessor-based computing devices, e.g., generic computing devices including respective processors and memories, electronic controllers or the like, field-programmable gate arrays (FPGA), application-specific integrated circuits (ASIC), combinations of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The second control modules 115 can thus each include a processor, a memory, etc. The memories of the second control modules 115 can include media for storing instructions executable by the processors as well as for electronically storing data and/or databases, and/or the second control modules 115 can include structures such as the foregoing by which programming is provided.

The vehicle system 105 may include the third control modules 125. The term "third control modules" is used herein to refer to control modules that do not use authentication keys 210 from the update command 200. For example, communications to and from the third control modules 125 may be unencrypted. The third control modules 125 are microprocessor-based computing devices, e.g., generic computing devices including respective processors and memories, electronic controllers or the like, field-programmable gate arrays (FPGA), application-specific integrated circuits (ASIC), combinations of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The third control modules 125 can thus each include a processor, a memory, etc. The memories of the third control modules 125 can include media for storing instructions executable by the processors as well as for electronically storing data and/or databases, and/or the third control modules 125 can include structures such as the foregoing by which programming is provided.

The second control modules 115 and third control modules 125 are programmed for performing different functions for the vehicle 100. For example, the second control modules 115 and third control modules 125 may include an engine control module, a body control module, a restraint control module, an accessory control module, a power-steering control module, an antilock brake control module, etc. The vehicle 100 may contain between fifty and one hundred control modules 110, 115, 125.

The vehicle system 105 may include the transceiver 130. The transceiver 130 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 130 may be adapted to communicate with a remote server 135, that is, a server distinct and spaced from the vehicle 100. The transceiver 130 may be one device or may include a separate transmitter and receiver.

The remote server 135 may be located outside the vehicle 100. For example, the remote server 135 may be associated with a manufacturing facility or service center for the vehicle 100, another vehicle (e.g., V2V communications), an infrastructure component (e.g., V2I communications), an emergency responder, a mobile device associated with the owner of the vehicle 100, etc.

The second control modules 115 are programmed to encrypt and decrypt messages with the authentication keys 210. For example, the authentication keys 210 may be symmetric encryption keys. Two (at least) second control modules 115 may store the same authentication key 210. One of the two second control modules 115 may encrypt a message using the authentication key 210 and transmit the message to the other of the two second control modules 115, and the other of the two second control modules 115 may decrypt the message using that same authentication key 210.

The second control modules 115 may belong to groups 140. The second control modules 115 in each group 140 may be associated with one of the authentication keys 210, e.g., there is a one-to-one correspondence between the groups 140 and the authentication keys 210. Each second control module 115 in one of the groups 140 may be programmed to encrypt messages to others of the second control modules 115 in that group 140 with the authentication key 210 associated with that group 140. More than one of second control modules 115, i.e., one of the groups 140, may be associated with each authentication key 210. Each group 140 may correspond to a function or feature of the vehicle 100, e.g., braking, steering, drivetrain, climate control of a passenger cabin, infotainment, etc. Each second control module 115 may belong to one or multiple groups 140, e.g., a second control module 115 that reports a speed of the vehicle 100 may belong to a group 140 for braking and a group 140 for drivetrain.

Figure 2:
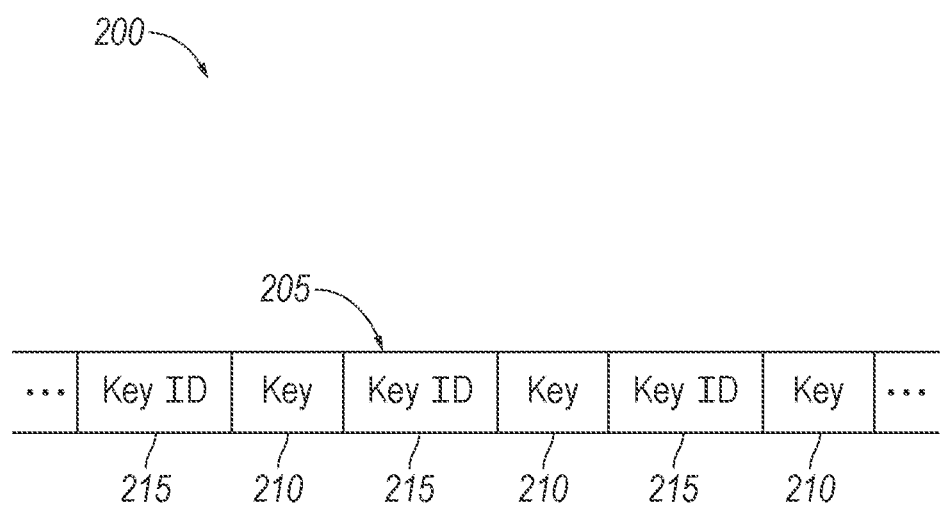
FIG. 2 is a diagram of an example update command to distribute authentication keys to second control modules of the vehicle.

With reference to FIG. 2, the update command 200 includes a listing 205 of the authentication keys 210. For example, the listing 205 may form a payload of the update command 200. The update command 200 may lack an association between the authentication keys 210 and the second control modules 115.

The listing 205 of the authentication keys 210 may include the authentication keys 210 paired with respective key identifiers 215. Each key identifier 215 may be a string uniquely specifying one of the authentication keys 210. The authentication keys 210 and the key identifiers 215 may have a one-to-one correspondence. The listing 205 may include the pairs of key identifiers 215 and authentication keys 210 concatenated together.

The authentication keys 210 in the update command 200 may be encrypted, i.e., an encryption algorithm may be executed on the authentication key 210. For example, the encryption algorithm can be any suitable algorithm, e.g., Advanced Encryption Standard (AES). For another example, a hash algorithm may be executed on the authentication key 210. The hash algorithm can be a cryptographic hash function, e.g., a keyed cryptographic hash function such as BLAKE2, BLAKE3, HMAC, KMAC, MD6, one-key MAC, PMAC, Poly1305-AES, SipHash, HighwayHash, UMAC, VMAC, etc., or may be a simpler hash function such as MD5. The authentication keys 210 in the update command 200 may be differently encrypted from each other. For example, the authentication keys 210 may be encrypted with an encryption key unique to each second control module 115 and known only to the remote server 135. For another example, the authentication keys 210 may be hashed with a keyed cryptographic hash function that keyed from a different value for each authentication key 210. The independent encryption may prevent the second control modules 115 from accessing unassociated authentication keys 210.

Figure 3:
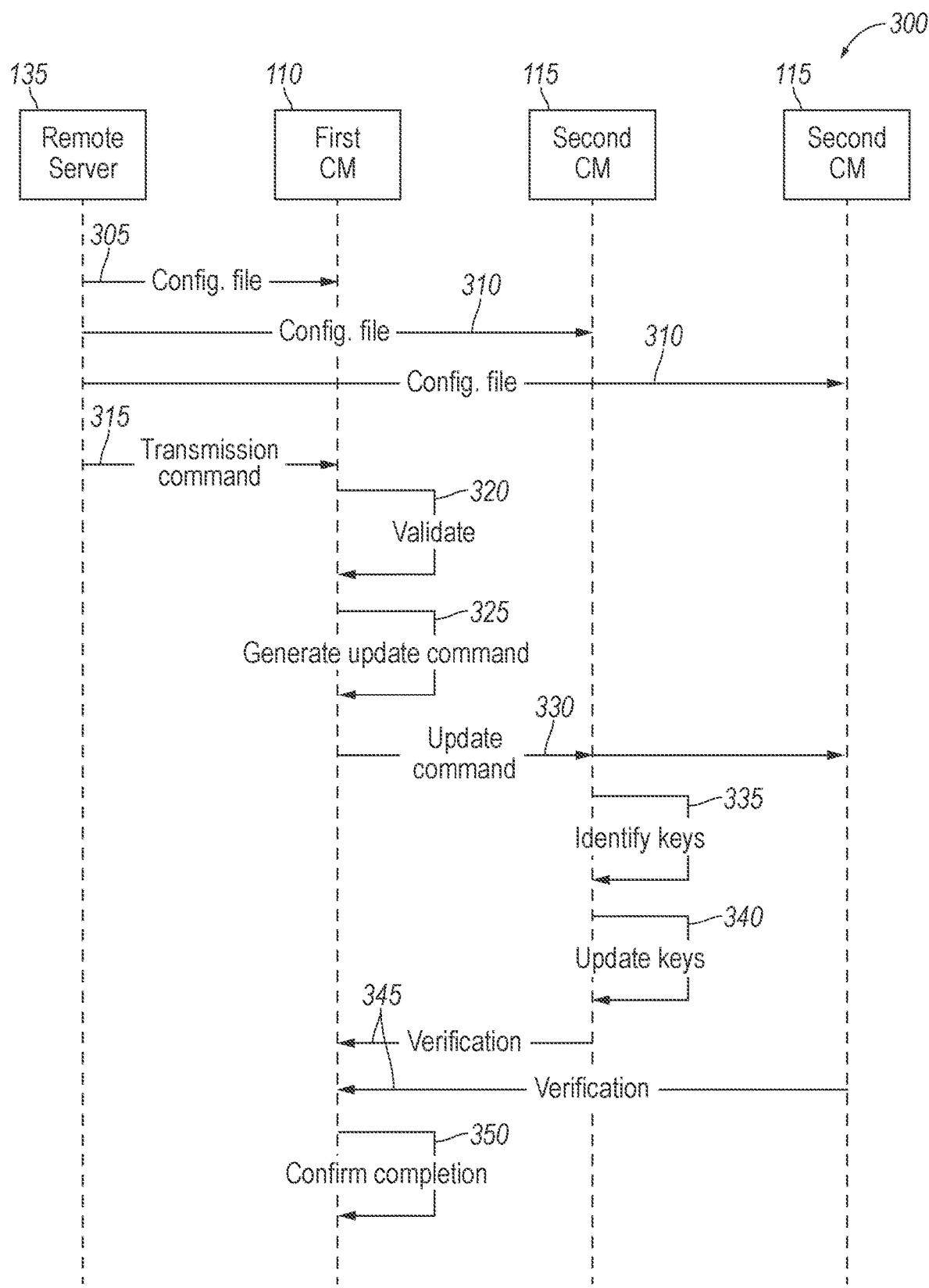
FIG. 3 is a sequence diagram of an example process for a first control module of the vehicle to distribute the authentication keys to the second control modules.

FIG. 3 is a sequence diagram illustrating an example process 300 for the first control module 110 of the vehicle 100 to distribute the authentication keys 210 to the second control modules 115. The memories of the remote server 135, the first control module 110, and/or the second control modules 115 may store executable instructions for performing the steps of the process 300 and/or programming can be implemented in structures such as mentioned above.

The process 300 begins in a step 305, in which the remote server 135 transmits a first configuration file to the first control module 110, e.g., via the transceiver 130, and the first control module 110 receives the first configuration file. The first configuration file indicates the groups 140 of the second control modules 115. The groups 140 may be identified by, e.g., the key identifiers 215 of the associated keys or by some other unique identifier. The second control modules 115 may be identified by the module identifiers. The first configuration file may include the authentication keys 210, or the authentication keys 210 may already be loaded onto the first control module 110.

Next, in a step 310, the remote server 135 transmits respective second configuration files to the second control modules 115, e.g., via the transceiver 130, and the second control modules 115 receive the respective second configuration files. The second configuration file for each second control module 115 indicates the groups 140 to which that second control module 115 belongs. The second configuration file for each second control module 115 may lack an indication of the groups 140 to which other second control modules 115 belong. Each second configuration file may further indicate the authentication keys 210 that are associated with the respective second control module 115, e.g., by listing the key identifiers 215 for the authentication keys 210 that are associated with that second control module 115. Each second configuration file may not indicate, i.e., may lack an indication of, the authentication keys 210 that are associated with others of the second control modules 115 besides the respective second control module 115.

Next, in a step 315, the remote server 135 transmits a transmission command to the first control module 110, and the first control module 110 receives the transmission command. The transmission command instructs the first control module 110 to transmit the update command 200 to the second control modules 115. The transmission command may be signed with a digital signature, i.e., may include signature data encrypted with a private key. The transmission command may be triggered by an input from an operator of the remote server 135 or by the vehicle 100 entering a particular section of the manufacturing process.

Next, in a step 320, the first control module 110 validates the transmission command. For example, the first control module 110 may decrypt the signature data in the transmission command using a public key corresponding to the private key used by the remote server 135 to sign the transmission command. The first control module 110 refrains from transmitting the update command 200 until the transmission command is validated.

Next, in a step 325, the first control module 110 generates the update command 200 in response to receiving and validating the transmission command.

Next, in a step 330, the first control module 110 transmits the update command 200 over the vehicle network 120 in response to receiving and validating the transmission command, e.g., upon generating the update command 200, and the second control modules 115 receive the update command 200. For example, the update command 200 may be functionally addressed to be receivable by the second control modules 115. For the purposes of this disclosure, a message that is "functionally addressed" is defined as a message labeled based on the operation code or content of the message. Functional addressing is distinguished from physical addressing, i.e., identifying the particular control module 110, 115, 125 that should receive the message. The update command 200 may thus be receivable by any entity on the vehicle network 120, i.e., the second control modules 115 as well as the third control modules 125, which are not listed in the update command 200.

Next, in a step 335, each second control module 115 identifies the authentication keys 210 that are associated with that second control module 115 based on the respective second configuration file in response to receiving the update command 200. For example, the second control module 115 may select the authentication keys 210 paired with the key identifiers 215 listed in the second configuration file sent to that second control module 115.

Next, in a step 340, each second control module 115 updates with the identified authentication keys 210, e.g., with the authentication keys 210 of the key identifiers 215 from the respective second configuration file. For example, the second control module 115 may save the identified authentication keys 210 in memory associated with the respective groups 140 to which the second control module 115 belongs, for later use in encrypting and decrypting messages within those groups 140, as described above.

Next, in a step 345, each second control module 115 transmits a respective verification to the first control module 110 in response to receiving the update command 200 and updating with the identified authentication keys 210, and the first control module 110 receives the plurality of verifications. The verifications indicate that the respective second control modules 115 received the update command 200 and updated with the authentication keys 210.

Next, in a step 350, the first control module 110 confirms completion of the distribution of the authentication keys 210. For example, the first control module 110 may output a message indicating successful completion. After the step 350, the process 300 ends.

Figure 4:
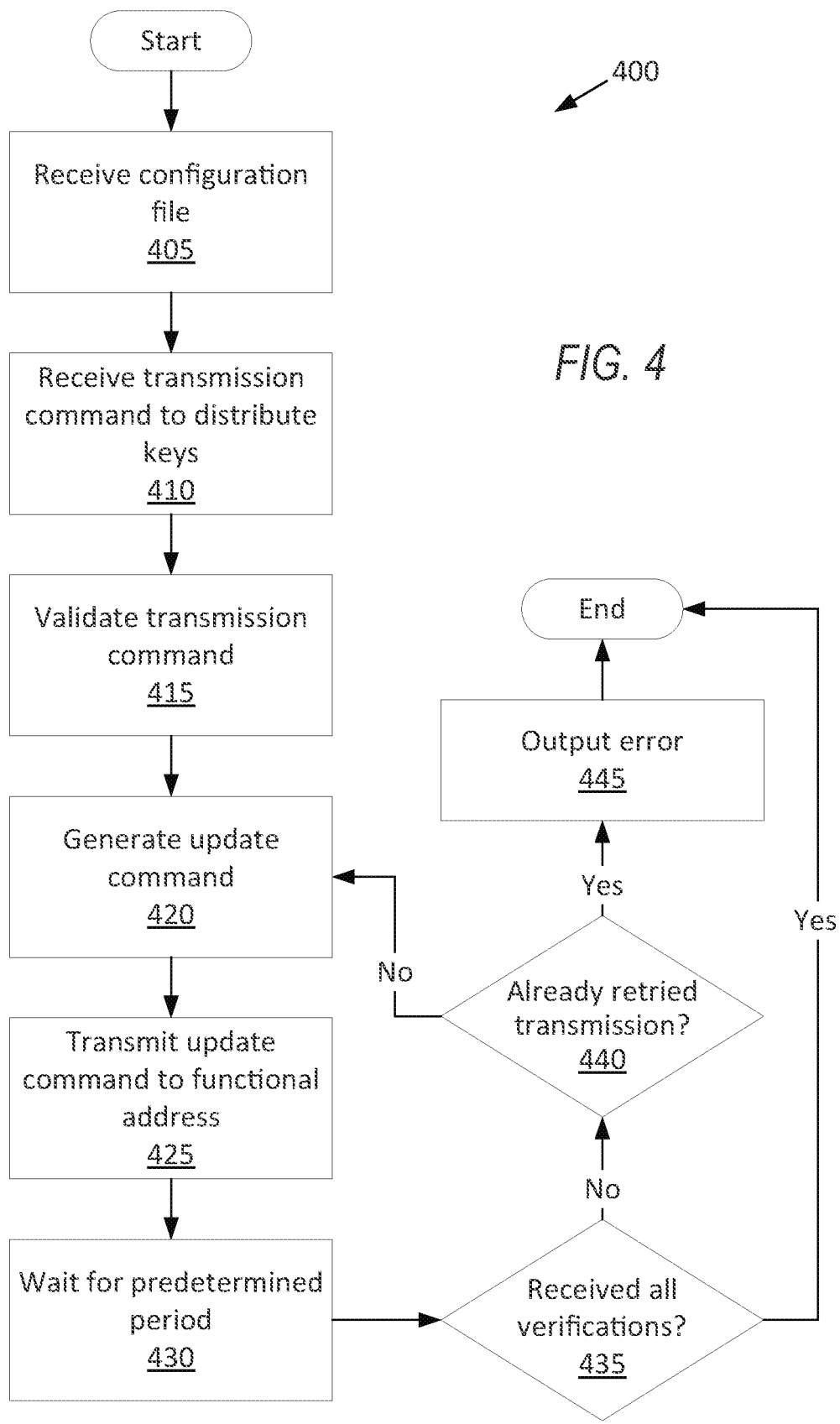
FIG. 4 is a process flow diagram of an example process for the first control module to distribute the authentication keys.

FIG. 4 is a process flow diagram illustrating an example process 400 for the first control module 110 to distribute the authentication keys 210. The memory of the first control module 110 stores executable instructions for performing the steps of the process 400 and/or programming can be implemented in structures such as mentioned above. As a general overview of the process 400, the first control module 110 receives the first configuration file, receives the transmission command, validates the transmission command, generates the update command 200, transmits the update command 200, and waits for a predetermined period. Upon receiving the plurality of verifications from the second control modules 115, the process 400 ends as a successful distribution. Upon failing to receive the verification from at least one of the second control modules 115, the first control module 110 again generates the update command 200, transmits the update command 200, and waits for the predetermined period. Upon again failing to receive the verification from at least one of the second control modules 115, the first control module 110 outputs an error message.

The process 400 begins in a block 405, in which the first control module 110 receives the first configuration file indicating the groups 140 of the second control modules 115, as described above.

Next, in a block 410, the first control module 110 receives the transmission command, as described above.

Next, in a block 415, the first control module 110 validates the transmission command, as described above.

Next, in a block 420, the first control module 110 generates the update command 200 including the authentication keys 210, as described above.

Next, in a block 425, the first control module 110 transmits the update command 200 over the vehicle network 120, as described above.

Next, in a block 430, the first control module 110 waits to receive the verifications indicating that the second control modules 115 received the update command 200. For example, the first control module 110 may wait for a predetermined period. The predetermined period may be chosen to encompass a range of typical times for all the second control modules 115 to transmit the verifications when no errors occur.

Next, in a decision block 435, the first control module 110 determines whether the first control module 110 received the verifications from all the second control modules 115, e.g., during the predetermined period. Upon receiving all the verifications, the process 400 ends. Upon failing to receive the verification from at least one of the second control modules 115, the process 400 proceeds to a decision block 440.

In the decision block 440, the first control module 110 determines whether the first control module 110 has retransmitted the update command 200 over the vehicle network 120 at least once, i.e., has executed the block 425 at least a second time. If not, the process 400 returns to the block 420 to re-generate the update command 200, retransmit the update command 200, and rewait for the predetermined period. If so, the process 400 proceeds to a block 445.

In the block 445, the first control module 110 outputs an error message. The error message may indicate that the distribution of the authentication keys 210 was unsuccessful. The error message may include identifiers for the second control modules 115 from which the first control module 110 failed to receive the verifications. For example, the first control module 110 may transmit the error message to the remote server 135 and/or display the error message with a user interface of the vehicle 100. After the block 445, the process 400 ends.

Figure 5:
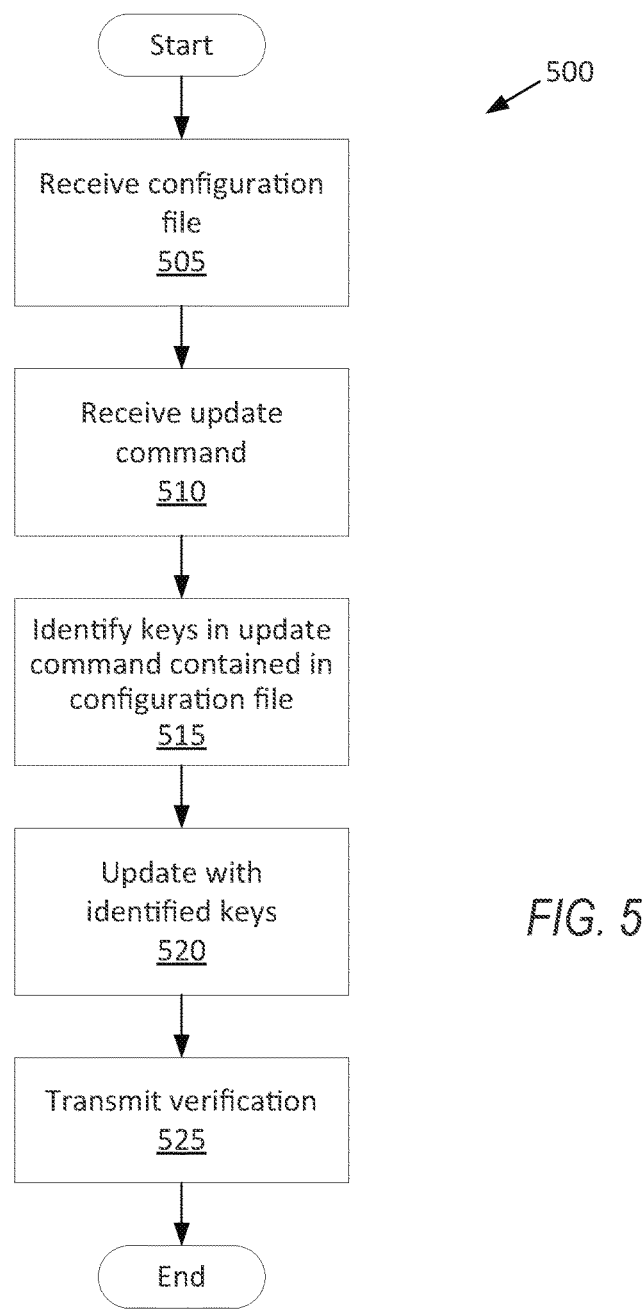
FIG. 5 is a process flow diagram of an example process for the second control modules to receive the authentication keys.

FIG. 5 is a process flow diagram illustrating an example process 500 for one of the second control modules 115 to receive the authentication keys 210. The memory of the second control module 115 stores executable instructions for performing the steps of the process 500 and/or programming can be implemented in structures such as mentioned above. As a general overview of the process 500, the second control module 115 receives the second configuration file, receives the update command 200, identifies the authentication keys 210 that are associated with the second control module 115, updates with the identified authentication keys 210, and transmits the verification.

The process 500 begins in a block 505, in which the second control module 115 receives the second configuration file from the remote server 135, as described above.

Next, in a block 510, the second control module 115 receives the update command 200 from the first control module 110, as described above.

Next, in a block 515, the second control module 115 identifies the authentication keys 210 that are associated with the second control module 115 based on the second configuration file, as described above.

Next, in a block 520, the second control module 115 updates with the identified authentication keys 210, as described above.

Next, in a block 525, the second control module 115 transmits the verification to the first control module 110, as described above. After the block 525, the process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle system comprising:
a first control module;
a plurality of second control modules; and
a vehicle network, the vehicle network communicatively coupling the first control module and the second control modules;
wherein the first control module is programmed to:
generate an update command including a plurality of authentication keys; and
transmit the update command over the vehicle network, wherein the update command is functionally addressed to be receivable by the second control modules without identifying specific second control modules as recipients; and
wherein each second control module is programmed to:
receive a respective configuration file;
in response to receiving the update command, identify a subset of the plurality of authentication keys in the update command that are associated with that second control module based on the respective configuration file; and
update with the identified subset of the plurality of authentication keys.

2. The vehicle system of claim 1, wherein the configuration files indicate the authentication keys that are associated with the respective second control modules.

3. The vehicle system of claim 2, wherein each configuration file indicates the authentication keys that are associated with the respective second control module and does not indicate the authentication keys that are associated with others of the second control modules.

4. The vehicle system of claim 2, wherein the configuration files list key identifiers for the authentication keys that are associated with the respective second control modules.

5. The vehicle system of claim 1, wherein the update command lacks an association between the authentication keys and the second control modules.

6. The vehicle system of claim 1, wherein more than one of the second control modules are associated with one of the authentication keys.

7. The vehicle system of claim 1, wherein the first control module is further programmed to receive a transmission command, and transmit the update command in response to receiving the transmission command.

8. The vehicle system of claim 7, wherein the first control module is further programmed to validate the transmission command, and refrain from transmitting the update command until the transmission command is validated.

9. The vehicle system of claim 7, wherein the configuration files are second configuration files, the first control module is further programmed to receive a first configuration file, and after receiving the first configuration file, receive the transmission command.

10. The vehicle system of claim 1, wherein the authentication keys in the update command are encrypted.

11. The vehicle system of claim 10, wherein the authentication keys in the update command are differently encrypted from each other.

12. The vehicle system of claim 1, wherein the update command is receivable by a third control module that is not associated with any of the authentication keys in the update command.

13. The vehicle system of claim 1, wherein the first control module is further programmed to receive a plurality of verifications indicating that the second control modules received the update command.

14. The vehicle system of claim 13, wherein the first control module is further programmed to, upon failing to receive at least one of the verifications from at least one of the second control modules, retransmit the update command over the vehicle network.

15. The vehicle system of claim 1, wherein the authentication keys are symmetric encryption keys.

16. The vehicle system of claim 1, wherein each second control module is programmed to, in response to receiving the update command, transmit a verification to the first control module.

17. The vehicle system of claim 1, wherein the second control modules are programmed to encrypt messages with the authentication keys.

18. The vehicle system of claim 17, wherein a first key of the authentication keys is associated with a group of the second control modules, and each second control module in the group is programmed to encrypt messages to others of the second control modules in the group with the first key.

19. The vehicle system of claim 1, wherein each configuration file indicates at least one group of the second control modules to which the respective second control module belongs, and the second control modules in each group are associated with one of the authentication keys.

20. A method comprising:
receiving a configuration file by a second control module;
generating an update command including a plurality of authentication keys by a first control module;
transmitting the update command over a vehicle network by the first control module, wherein the update command is functionally addressed to be receivable by a plurality of control modules including the second control module without identifying specific second control modules as recipients;
in response to receiving the update command, identifying a subset of the plurality of authentication keys in the update command that are associated with that second control module based on the configuration file by the second control module; and
updating with the identified subset of the plurality of authentication keys by the second control module.

* * * * *